United States Patent [19]
Webb et al.

[11] Patent Number: 4,713,399
[45] Date of Patent: Dec. 15, 1987

[54] FLEXIBLE POLYURETHANE FOAMS PREPARED FROM POLY(ALKYLENE CARBONATE) POLYOLS

[75] Inventors: Daniel D. Webb, Lake Jackson, Tex.; Donald G. Prier, Baton Rouge, La.

[73] Assignee: The Dow Chemical Company, Midland, Mich.

[21] Appl. No.: 814,850

[22] Filed: Dec. 30, 1985

[51] Int. Cl.$^4$ ............................................ C08G 18/14
[52] U.S. Cl. ..................................... 521/110; 252/182; 521/111; 521/112; 521/131; 521/159; 521/170; 521/172; 521/173
[58] Field of Search ............... 521/110, 111, 112, 131, 521/159, 170, 172, 173; 252/182

[56] References Cited

U.S. PATENT DOCUMENTS 3,312,653  4/1967  Pace ..................................... 524/173
4,554,295 11/1985  Ridge .................................. 521/112

Primary Examiner—Maurice J. Welsh

[57] ABSTRACT

In one aspect, this invention is a polyurethane foam which is the reaction product of a reaction mixture comprising a poly(alkylene carbonate) polyol, a silicone surfactant, a blowing agent, and a polyisocyanate.

In another aspect, this invention is an active hydrogen-containing composition comprising a poly(alkylene carbonate) polyol having an equivalent weight from about 100 to about 3000, a blowing agent and a silicone surfactant.

13 Claims, No Drawings

FLEXIBLE POLYURETHANE FOAMS PREPARED FROM POLY(ALKYLENE CARBONATE) POLYOLS

BACKGROUND OF THE INVENTION

This invention relates to flexible polyurethane foams, more particularly to flexible polyurethane foams prepared using poly(alkylene carbonate) polyols.

Conventional polyurethane foams have usually been prepared by reacting a polyether polyol or a polyester polyol with a polyisocyanate in the presence of a blowing agent. Unfortunately, these foams have very poor solvent stability; that is, they tend to readily degrade, swell or dissolve in the presence of a variety of solvents, particularly organic solvents. This property severely restricts the range of utility for such foams, since they cannot be used in the presence of organic solvents.

Poly(alkylene carbonate) polyols (hereinafter PAC polyols or PACs) are hydroxyl-terminated polymers containing repeating carbonate linkages. PACs are readily prepared by reacting an oxirane such as ethylene oxide with carbon dioxide and/or a cyclic alkylene carbonate in the presence of an initiator to form a polymer having an equivalent weight from about 100 to about 3000. Such PACs typically contain about 2 to about 33% (depending on the equivalent weight and choice of initiators) by weight of repeating —COO— units, and a significant proportion of ether linkages.

As hydroxyl-terminated polymers, PACs have been suggested for use in preparing polyurethanes. See, for example, U.S. Pat. No. 3,764,457, in which a polyurethane elastomer-containing laminate is disclosed. Because of the low cost and good properties of the PACs, it would be desirable to provide a polyurethane foam prepared therefrom.

It would also be desirable to provide a polyurethane foam which has improved solvent resistance as compared to polyurethane foams which are prepared from polyether polyols or polyester polyols. It would also be desirable to provide a polyurethane foam which has good inherent antistatic properties.

SUMMARY OF THE INVENTION

This invention is such a polyurethane foam. In one aspect, this invention is a polyurethane foam which is the reaction product of a reaction mixture comprising a poly(alkylene carbonate) polyol, a silicone surfactant, a blowing agent and a polyisocyanate. This foam exhibits improved solvent resistance as compared to a similar foam prepared from a polyether polyol or a polyester polyol. This improved solvent resistance is quite surprising in that the PAC polyol normally contains a significant proportion of ether linkages, and the carbonate linkage is structurally similar to an ester linkage. The PAC therefore provides improved solvent resistance despite a significant structural resemblance to both polyethers and polyesters.

In another aspect, this invention is an active hydrogen-containing composition comprising a poly(alkylene carbonate) polyol having an equivalent weight from about 100 to about 3000, a blowing agent and a silicone surfactant. This composition, when reacted with a polyisocyanate, forms a polyurethane foam having improved solvent resistance as described before.

In addition, the polyurethane foam of this invention has been found to exhibit better flame resistance than similar foams prepared from polyether polyols, and also exhibits inherent antistatic properties.

DETAILED DESCRIPTION OF THE INVENTION

The active hydrogen-containing composition of this invention comprises a PAC polyol as described hereinafter, a blowing agent, and a polysiloxane surfactant.

The PAC polyol employed herein is a polymer of an oxirane and carbon dioxide or cyclic alkylene carbonate. Such PACs are represented by the idealized structure:

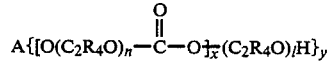

wherein each R is independently hydrogen, halogen or inertly substituted alkyl or phenyl, A represents the residue from a polyhydric initiator, y is a number from about 2–8, 1 and n are numbers such that the PAC contains about 2 to about 35% by weight carbon dioxide, and x is a number such that the PAC has an equivalent weight of about 100 to about 3000. Preferably each R is hydrogen or lower alkyl, more preferably hydrogen or methyl, and most preferably hydrogen. The PAC also preferably has an equivalent weight of about 500 to about 2000, more preferably about 800 to about 1500. Preferred PACs contain about 5–25, more preferably 10–20% carbon dioxide by weight of the PAC. The value of y is preferably about 2–4, more preferably about 2–3.

The PAC can be prepared by reacting an oxirane with either carbon dioxide or a cyclic alkylene carbonate, or a mixture thereof in the presence of a suitable initiator. Oxiranes useful herein contain an epoxy group and are otherwise inertly substituted, i.e. contain no moieties which undesirably interfere with the preparation of a PAC therefrom or the preparation of a polyurethane foam from the PAC. Suitable oxiranes include ethylene oxide, propylene oxide, butylene oxide, styrene oxide, epichlorohydrin, epibromohydrin and the like. Most preferred is ethylene oxide due to its relatively facile reaction with carbon dioxide and/or a cyclic alkylene carbonate. Cyclic alkylene carbonates useful to prepare the PAC are represented by the structure:

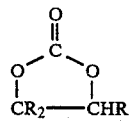

wherein each R is as defined hereinbefore. Each R is preferably hydrogen or lower alkyl, more preferably hydrogen or methyl, and most preferably hydrogen.

The PAC is advantageously prepared by reacting the oxirane with carbon dioxide and/or cyclic alkylene carbonate in the presence of an initiator under conditions of elevated temperature and pressure in the presence of an alkali metal or stannate catalyst. Suitable processes for preparing PACs are described, for example, in U.S. Pat. Nos. 3,248,414, 3,248,415, 3,248,416, 4,330,481 and 3,689,462, incorporated herein by reference. An especially preferred process for preparing PACs is described in an application of Myers entitled "Process for Preparing Poly(Alkylene Carbonates)", filed on even date herewith.

The active hydrogen-containing composition further contains a blowing agent. Any material which forms or liberates a gas under the conditions of the reaction of the PAC and a polyisocyanate is useful as the blowing agent herein. Water is suitable for that purpose. Low boiling compounds, particularly halogenated alkanes such as methylene chloride, monochlorotrifluoromethane, dichlorodifluoromethane, trichloromonofluoromethane, dichloromonofluoromethane, monochlorodifluoromethane and the like are suitable as well. The so-called azo blowing agents, which release gaseous nitrogen, are also useful. In addition, finely particulate solids which have atmospheric gases sorbed onto their surfaces can be used. Preferred are water and the halogenated alkanes.

The blowing agent is used in an amount sufficient to provide a cellular structure to the polymer. When water is used as the blowing agent, it is commonly used in amounts from about 0.5 to about 5 parts per 100 parts by weight of the foam. Halogenated alkanes are typically used in an amount from about 2 to 60 parts per 100 parts by weight polymer. Of course, the amount of blowing agent used will depend on the desired density of the polymer. It is well known in the art to vary the amount of blowing agent in order to obtain a foam of desired density.

The active hydrogen-containing composition further contains a surfactant to stabilize the foaming mixture until the polymer is sufficiently cured to maintain its shape. The silicone surfactant is preferably compatible with the other components in the active hydrogen-containing composition, particularly with the PAC polyol and is capable of stabilizing the foaming reaction mixture until it is cured. Of the silicone surfactants which are commonly used in the preparation of polyurethane foams, those commonly used in the preparation of foams from polyester polyols are preferred. Particular commercial surfactant of this type include those having the structures:

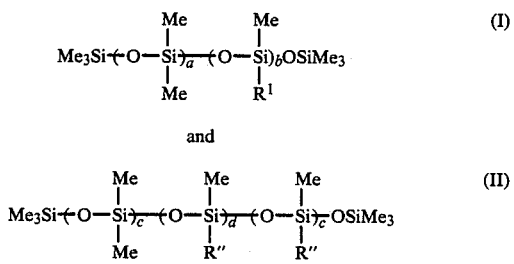

wherein R' is —$C_3H_6O(C_nH_{2n}O)_mCH_3$, R" is —$C_nH_{2n}CN$, Me is a methyl group and a, b, c, d, e, m and n are positive numbers. A commercial product corresponding to structure (I) is silicone L-532, available from Union Carbide Corporation. A commercial product corresponding to structure II is Silicone L-536, available from Union Carbide Corporation. Other silicone surfactants indicated to be suitable for use in preparing polyester polyol foams, as described in U.S. Pat. Nos. 3,833,512, 3,796,672, and 4,031,042 (incorporated by reference) are useful herein.

The surfactant is employed in an amount sufficient to stabilize the foaming reaction mixture until the polymer is sufficiently cured to maintain its shape. Typically, about 0.1 to 5, preferably about 0.2 to about 2 parts of surfactant are used per 100 parts PAC.

Other materials are optionally employed in the active hydrogen-containing composition. Other isocyanate-reactive materials, in particular low equivalent weight polyols, polyamines or alkanolamines are often useful in preparing flexible foams. These low equivalent weight materials often provide more rapid curing in the initial stages of the foaming reaction. They are typically present in an amount from about 0–2 percent of the weight of the PAC. Particularly suitable low equivalent weight materials include ethylene glycol, propylene glycol, ethanolamine, diethanolamine, triethanolamine and the like.

In addition, catalysts are advantageously used in the active hydrogen-containing composition. Such catalysts promote the reaction between the PAC and a polyisocyanate, and also promote the blowing reaction between water and the polyisocyanate, when water is used as the blowing agent. Suitable catalysts include the well-known organometallic and tertiary amine catalysts. Suitable catalysts are described, for example, in U.S. Pat. No. 4,495,081, incorporated herein by reference. Generally preferred are mixture of tertiary amine and organotin catalysts. The amine catalysts are typically used in concentration from about 0.03 to about 0.9 parts per part PAC used in preparing the foam. Organometallic catalysts are typically used in amount from about 0.1 to about 5 parts per 100 parts PAC.

Other optional additivies include mold release agents, antioxidants, inorganic fillers, glass and other fibers, antistatic agents, fire or flame retardants, pigments, dyes and the like.

The active hydrogen-containing composition of this invention is reacted with a polyisocyanate to form a flexible foam. Suitable polyisocyanates include aliphatic polyisocyanates as well as aromatic polyisocyanates. Such polyisocyanates are described, for example, in U.S. Pat. Nos. 4,065,410, 3,401,180, 3,454,606, 3,152,162, 3,492,330, 3,001,973, 3,394,164, and 3,124,605, all incorporated herein by reference.

Aromatic polyisocyanates useful herein include 2,4- and/or 2,6-toluenediisocyanate, p,p'-diphenylmethanediisocyanate (MDI), p-phenylenediisocyanate, polymethylenepolyphenylpolyisocyantes, mixtures thereof and the like. Also useful are polymeric derivatives of p,p'-phenylmethanediisocyanate as well as quasi-prepolymers thereof.

Useful aliphatic polyisocyanates include the hydrogenated derivatives of the foregoing aromatic polyisocyanate, as well as hexamethylene diisocyanate, isophorone diisocyanate, 1,4-cyclohexane diisocyanate and the like.

In addition, prepolymers and quasi-prepolymers of the foregoing polyisocyanates are useful in this invention.

In preparing a foam with the active hydrogen-containing composition, it is advantageously blended with the polyisocyanate, adjusted to a temperature of about ambient to 150° C., and maintained at such temperature until curing and blowing are complete. In preparing slabstock foam, the foaming mixture is permitted to freely rise against the force of gravity. In preparing molded foams, the mixture is placed into a mold where it is heated to a temperature at which the blowing and curing processes take place. Sufficient of the mixture is placed in the mold to permit the mold to be filled upon complete blowing and curing.

The foams produced according to this invention are useful as seat cushions, padding, electronic packaging, carpet backing or padding, fuel tank baffles, pipe line cleaners, lightweight energy absorbing molded articles such as automobile dashboards, and the like.

The following examples are provided to illustrate the invention but are not intended to limit the scope thereof. All parts and percentages are by weight unless otherwise indicated.

EXAMPLE 1

Into a suitable container equipped with a high shear mixer are placed 1000 grams (g) of an ethylene glycol-initiated PAC diol containing 16% carbon dioxide and having an equivalent weight of about 1020. With rapid agitation, 0.5 g of a 33% triethylenediamine solution, 36 g of water, 13 g of a silicone surfactant (sold commercially as L-536 surfactant by Union Carbide Corporation) and 1 g of stannous octoate are added and mixed for 30 seconds. Then, 477 grams of (80/20 mixture of 2,4- and 2,6-isomers) toluenediisocyanate (TDI) are added to the mixture with agitation. The mixture is poured into a 15"×15"×10" wooden box and the foam permitted to rise. The mixture exhibits a "cream time" (the time until a visible reaction occurs) of 12 seconds and a rise time of 105 seconds. The foam is permitted to cure overnight at room temperature. The cured foam (Sample No. 1) has properties as indicated in Table I following.

EXAMPLE 2

In a manner similar to that described in Example 1, a flexible foam is prepared from the following formulation: 800 g of an 850 equivalent weight PAC triol containing 23.2% carbon dioxide, 0.4 g of a 33% triethylene diamine solution, 28 g water, 4 g of a silicone surfactant sold commercially as L-532 surfactant by Union Carbide Corporation, 0.48 g stannous octoate, and 16 g di(2-chloro-ethoxy)phosphoroethoxyl di(2-chloroethoxyl)phosphate (Thermolin 101, sold by Olin Chemicals). This formulation is thoroughly blended with 382 g TDI and foamed. The cream time is 15 seconds and the rise time is 106 seconds. The resulting foam (Sample No. 2) has properties as indicated in Table I following.

TABLE I

|  | Sample No. | |
|---|---|---|
|  | 1 | 2 |
| Density,[1] lb/ft$^3$ | 1.71 | 1.77 |
| Tensile Strength,[2] psi | 17.8 | 13.7 |
| Elongation,[2] % | 169 | 202 |
| Tear Resistance,[3] lb/in | 3.7 | 3.1 |
| IFD[4] | | |
| 25% | 44 | 36 |
| 65% | 82 | 76 |
| Return to 25% | 24 | 17 |
| % Hystersis Return[2] | 54 | 47 |
| Modulus[5] | 1.87 | 2.13 |
| Compression Set[6] (90%) | N.D. | 67 |

N.D. - Not Determined
[1]ASTM 3574-71 Test A
[2]ASTM 3574-71 Test E
[3]ASTM 3574-71 Test F
[4]IFD = Indentation Force Deflection. ASTM 3574-71 Test B
[5]Modulus equals the ratio of 65% IFD to 254 IFD
[6]ASTM 3574-71 Test D

EXAMPLE 3

In a suitable container are blended 100 g of a 909 equivalent weight PAC triol containing 18.2% carbon dioxide, 10 g of methylene chloride, 4.5 g water, 0.5 g of the silicone surfactant described in Example 2, 0.03 g of a 33% triethylenediamine solution, 0.06 g stannous octoate and 47.9 g TDI. The mixture is poured into a two-quart open container and allowed to rise. The cream time is 12 seconds and the rise time is 196 seconds. The resulting foam is a large bun having a smooth top and even sides. It is very springy to the touch and has very few detectable closed cells.

EXAMPLE 4

In a manner similar to that described in Example 1, a flexible foam is prepared from the following formulations: 100 parts of a 1053 equivalent weight ethylene glycol-initiated PAC diol containing 15% carbon dioxide, 3.6 parts water, 0.8 parts L-532 surfactant, 0.05 parts of a 33% triethylene diamine solution and 0.188 parts stannous octoate. This formulation is thoroughly mixed with sufficient TDI to provide a 110 index and foamed. The rise time is 105 seconds.

The properties of the foam are as reported in Table II following. As can be seen from such data, the foam is able to quickly dissipate an applied static charge even though an antistatic additive is not included in the formulation. In addition, the foam exhibits very little swelling in the organic solvents.

TABLE II

| Density[1] (lb/ft$^3$) | 1.55 |
|---|---|
| Tensile Strength[2] (psi) | 6.6 |
| Elongation,[2] % | 111 |
| Tear Resistance,[3] lb/in | 1.4 |
| ILD[4] | |
| 25% | 23 |
| 65% | 42 |
| Return to 25% | 11 |
| % Hystersis Return[2] | 47 |
| Modulus[5] | 1.82 |
| Compression Set,[6] (90%) | 82 |
| Air Flow[7] | 0.62 |
| Solvent Swelling[8] % | |
| CCl$_4$ | 5.3 |
| Hexane | 1.9 |
| MeOH | 6.6 |
| Toluene | 5.2 |
| Static Dissipitation[9] sec | 14.11 |

[1]ASTM 3574-71 Test A
[2]ASTM 3574-71 Test E
[3]ASTM 3574-71 Test F
[4]ILD = Indentation Load Deflection. ASTM 3574-71 Test B
[5]Modulus equals the ratio of 65% IFD to 254 IFD.
[6]ASTM 3574-71 Test D
[7]ASTM 3574-71
[8]The volume change, expressed as a percentage of the original volume of a foam sample immersed in the stated solvent at room temperature.
[9]The time required for the sample to dissipate an applied static charge of ± 5000.

EXAMPLE V

Three flexible polyurethane foams (Sample Nos. 3–5) are prepared using PAC polyols, according to the general procedure described in Example 1, from the formulations indicated in Table III following. In addition, a polyether polyol foam (Comparative Sample A), a polyether polyol foam (Comparative Sample B) are similarly prepared from formulations which are also reported in Table III.

TABLE III

|  | Sample No. | | | | |
|---|---|---|---|---|---|
|  | 3 | 4 | 5 | A* | B* |
| PAC diol[1] | 100 | 100 | — | — | — |
| PAC triol[2] | — | — | 100 | — | — |
| Polyether polyol[3] | — | — | — | 100 | — |

TABLE III-continued

| | Sample No. | | | | |
|---|---|---|---|---|---|
| | 3 | 4 | 5 | A* | B* |
| Polyester polyol[4] | — | — | — | — | 100 |
| Water | 3.6 | 3.6 | 3.5 | 3.2 | 3.6 |
| L-536[5] | 1.3 | 1.3 | — | — | 1.3 |
| L-532 | — | — | 0.5 | — | — |
| BF-2370[6] | — | — | — | 1.0 | — |
| Amine Catalyst[7] | 0.05 | 0.05 | 0.05 | 0.025 | 0.05 |
| TDI (index)[8] | 110 | 110 | 110 | 110 | 110 |
| Tin Catalyst | 0.08 | 0.10 | 0.015 | 0.2 | 0.08 |

*Not an example of this invention.
[1]Polyalkylene carbonate diol containing 16.1% $CO_2$ and having an equivalent weight of 1018.
[2]Polyalkylene carbonate triol containing 27.3% $CO_2$ and having an equivalent weight of 850.
[3]A 3100 molecular weight poly(oxyethylene oxypropylene)triol.
[4]A commercial polyester polyol sold by Witco Chemical Company as Fomrez 53.
[5]A silicone surfactant sold by Union Carbide Corporation.
[6]A silicone surfactant sold by Goldschmidt Chemical Company.
[7]A 33% solution of triethylene diamine.
[8]TDI = toluene diisocyanate (80/20 mixture of 2,6- and 2,4-isomer).

The physical properties of each of Sample Nos. 3–5 and Comparative Samples A and B, as well as for a commercially available polyester polyurethane foam (Comparative Sample C) are determined and are as reported in Table IV following.

TABLE IV

| | Sample Number | | | | | |
|---|---|---|---|---|---|---|
| Property | 3 | 4 | 5 | A | B | C |
| Density[1], lb/ft[3] | 1.78 | 1.78 | 1.90 | 1.72 | 1.68 | 1.65 |
| Tensile Strength[2], psi | 15.8 | 18.0 | 15.8 | 11.8 | 22.4 | 25.0 |
| Elongation[2] % | 172 | 244 | 122 | 159 | 190 | 457 |
| Tear Resistance[3] lb/in | 4.0 | 4.1 | 2.3 | 1.9 | 2.8 | 4.4 |
| | 4.0 | 4.1 | 2.3 | 1.9 | 2.8 | 4.4 |
| ILD[4] | | | | | | |
| 25% | 44 | 41 | 52 | 39 | 55 | 35 |
| 65% | 82 | 75 | 106 | 67 | 110 | 61 |
| Return to 25% | 24 | 23 | 28 | 27 | 28 | 22 |
| % Hysteresis Return[2] | 54 | 56 | 54 | 70 | 51 | 65 |
| Modulus[5] | 1.87 | 1.82 | 2.02 | 1.73 | 2.00 | 1.76 |

N.D. - Not Determined
[1]ASTM 3574-71 Test A
[2]ASTM 3574-71 Test E
[3]ASTM 3574-71 Test F
[4]IFD = Indentation Force Deflection. ASTM 3574-71 Test B
[5]Modulus equals the ratio of 65% IFD to 254 IFD
[6]ASTM 3574-71 Test D The solvent resistance of foam Sample No. 3 is determined by immersing a 2"×2"×1" piece of foam in a particular organic solvent for 120 minutes. The volume of the foam is then measured to determine if any swelling occurs. Testing is done in hexane, toluene, methylethylketone, methanol and carbon tetrachloride. For comparison, Comparative Foam Samples A, B and C are also tested. The results are as indicated in Table V following

TABLE V

| | % Increase in Foam Volume Sample No. | | | |
|---|---|---|---|---|
| Solvent | 3 | A* | B* | C* |
| $CCl_4$ | 5.0 | 53.2 | 7.5 | 9.2 |
| Methylethylketone | 15.0 | 57.5 | 15.0 | 21.0 |
| Toluene | 5.0 | 55.0 | 10.0 | 12.8 |
| Methanol | 7.5 | 42.6 | 5.0 | 7.7 |
| n-Hexane | 2.5 | 14.2 | 0.0 | 6.2 |

*Not an example of this invention.

EXAMPLE VI

A series of foams (Sample Nos. 6–9) are prepared from a formulation containing 100 parts of a 977 equivalent weight PAC polyol containing 15.4% carbon dioxide, 2.5 parts water, 0.05–0.12 parts of a 33% triethylene diamine solution, 0.07 parts of a tin catalyst, 1.3 parts of L-532 surfactant and variable amounts of an antistatic additive. The antistatic additive consists of 1 part sodium thiocyanate, 10 parts of dibutoxyethoxyethyl adipate and 2 parts of a poly(propylene oxide). The isocyanate index is 105 for Sample No. 6 and 110 for Sample Nos. 7–9. The amine catalyst level is adjusted to provide a foam density of about 2.2–2.8 pounds per cubic foot. The density of the foam samples are measured, and the time required for the foam samples to dissipate an applied static charge of 5000 volts is determined as a measurement of the foam's antistatic characteristics. The results are as reported in Table VI following.

For comparison, three foams (Comparative Sample Nos. D–F) are prepared using a like formulation, but substituting a polyester polyol (Fomrez 53, from Witco Chemical Company) for the PAC polyol. Again, varying levels of antistatic additive are used. The density and antistatic properties of these foams are as indicated in Table VI.

TABLE VI

| Level of Antistatic Additive (parts) | PAC Polyol Foams | | Polyester Polyol Foams | |
|---|---|---|---|---|
| | Sample No. | decay time | Comp. No. | decay time |
| 0 | 6 | 0.85 | D | 8.90 |
| 0.5 | 7 | 0.20 | E | 2.87 |
| 1.0 | 8 | 0.11 | F | 1.67 |
| 5.0 | 9 | 0.03 | | |

As can be seen from the data in Table VI, the PAC polyol foam, at all levels of antistatic additive, dissipates a static charge substantially more rapidly than the polyester foam. In general, a decay time of less than 2.00 seconds is considered necessary to be used in antistatic applications. It is seen that the PAC polyol foam, even without antistatic additive, clearly exceeds this standard.

What is claimed is:

1. A polyurethane foam which is the reaction product of a reaction mixture comprising a poly(alkylene carbonate) polyol, a silicone surfactant, a blowing agent and a polyisocyanate, wherein the poly(alkylene carbonate) polyol is a polymer of an oxirane and carbon dioxide or a cyclic alkylene carbonate, said polymer having a carbon dioxide content of about 5–25% by weight and an equivalent weight from about 100 to 3000.

2. The foam of claim 1 wherein the reaction mixture contains from 0.1 to about 5 parts by weight of said surfactant per 100 parts of said poly(alkylene carbonate) polyol.

3. The foam of claim 2 wherein the blowing agent comprises water, a halogenated methane, or mixture thereof.

4. The foam of claim 3 wherein the poly(alkylene carbonate) polyol has an equivalent weight from about 500 to about 2000 and contains about 10 to about 20 percent by weight carbon dioxide.

5. The foam of claim 4 wherein the polyisocyante comprises toluenediisocyanate, diphenylmethanedisioscyanate, or mixtures, derivatives or prepolymers thereof.

6. A method of preparing a flexible polyurethane foam, comprising reacting a poly(alkylene carbonate) polyol with a polyisocyanate in the presence of a blowing agent and a block copolymer containing a polysiloxane and a polyether block, wherein the poly(alkylene carbonate) polyol is a polymer of an oxirane and carbon dioxide or a cyclic alkylene carbonate, said polymer having a carbon dioxide content of about 5–25% by weight.

7. The method of claim 6 wherein said surfactant is represented by the structure:

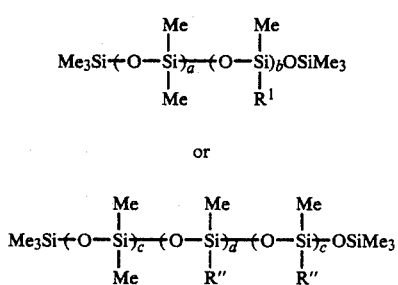

wherein R' is $-C_3H_6O(C_nH_{2n}O)_mCH_3$, R'' is $-C_nH_{2n}CN$, Me is a methyl group and a, b, c, d, e, m and n are positive number.

8. The method of claim 7 wherein said blowing agent comprises water, a halogenated methane or mixture thereof.

9. The method of claim 8 which contains, per 100 parts of said poly(alkylene carbonate) polyol, about 0.1 to about 5 parts by weight of said surfactant.

10. An active hydrogen-containing composition comprising a poly(alkylene carbonate) polyol which is the reaction product of an oxirane and carbon dioxide or cyclic alkylene carbonate, said polymer having a carbon dioxide content of about 5–25% by weight and an equivalent weight of from about 100 to about 3000, a blowing agent and a silicone surfactant.

11. The active hydrogen-containing composition of claim 10 wherein said blowing agent comprises water, a halogenated methane or a mixture thereof.

12. The active hydrogen-containing composition of claim 11 which contains, per 100 parts of said poly(alkylene carbonate) polyol, about 0.1 to about 5 parts by weight of said surfactant.

13. The active hydrogen-containing composition of claim 12 wherein said poly(alkylene carbonate) polyol has an equivalent weight from about 500 to about 2000 and contains about 10 to about 20 percent by weight carbon dioxide.

* * * * *